(12) United States Patent
Fujita et al.

(10) Patent No.: US 10,618,597 B2
(45) Date of Patent: Apr. 14, 2020

(54) BICYCLE SPROCKET ASSEMBLY

(71) Applicant: Shimano Inc., Sakai, Osaka (JP)

(72) Inventors: Hiroshi Fujita, Osaka (JP); Sota Yamaguchi, Osaka (JP)

(73) Assignee: Shimano Inc., Osaka (JP)

( * ) Notice: Subject to any disclaimer, the term of this patent is extended or adjusted under 35 U.S.C. 154(b) by 252 days.

(21) Appl. No.: 15/436,590

(22) Filed: Feb. 17, 2017

(65) Prior Publication Data
US 2018/0237103 A1    Aug. 23, 2018

(51) Int. Cl.
*B62M 9/10*       (2006.01)
*F16H 55/30*      (2006.01)

(52) U.S. Cl.
CPC ............... *B62M 9/10* (2013.01); *F16H 55/30* (2013.01)

(58) Field of Classification Search
CPC .................................. B62M 9/10; F16H 55/30
See application file for complete search history.

(56) References Cited

U.S. PATENT DOCUMENTS

| | | | | |
|---|---|---|---|---|
| 3,748,916 A * | 7/1973 | Morse | .................... | B62M 9/126 474/82 |
| 5,194,051 A * | 3/1993 | Nagano | .................... | B62M 9/10 474/160 |
| 7,931,553 B2 * | 4/2011 | Tokuyama | ............... | B62M 9/10 474/144 |
| 8,100,795 B2 * | 1/2012 | Reiter | ...................... | B62M 9/10 474/160 |
| 8,905,878 B2 * | 12/2014 | Loy | .......................... | B62M 9/10 474/160 |
| 2004/0070166 A1 * | 4/2004 | Valle | ........................ | B62M 9/10 280/260 |
| 2004/0121867 A1 * | 6/2004 | Reiter | ...................... | B62M 9/10 474/160 |
| 2006/0172840 A1 * | 8/2006 | Kamada | ................... | B62M 9/10 474/152 |
| 2012/0244976 A1 * | 9/2012 | Lin | .......................... | B62M 9/10 474/160 |
| 2015/0080160 A1 * | 3/2015 | Staples | .................... | B62M 9/10 474/160 |
| 2016/0114859 A1 * | 4/2016 | Tsai | ........................ | B62M 9/10 474/160 |
| 2016/0121965 A1 * | 5/2016 | Tsai | ........................ | B62M 9/10 264/263 |
| 2016/0167737 A1 | 6/2016 | Tokuyama et al. | | |
| 2016/0362159 A1 * | 12/2016 | Braedt | ..................... | B62M 9/10 |
| 2018/0257742 A1 * | 9/2018 | Chen | ....................... | F16H 55/30 |

* cited by examiner

*Primary Examiner* — Michael R Mansen
*Assistant Examiner* — Robert T Reese
(74) *Attorney, Agent, or Firm* — Global IP Counselors, LLP

(57) ABSTRACT

A bicycle sprocket assembly is basically provided that includes a sprocket support member. The sprocket support member includes a hub engagement portion, a first sprocket supporting member, and a second sprocket supporting member. The first sprocket supporting member extends from the hub engagement portion in a first axial direction parallel to a rotational center axis of the bicycle sprocket assembly. The second sprocket supporting member extends from the hub engagement portion in a second axial direction parallel to the rotational center axis. The second axial direction is opposite to the first axial direction. At least one of the first sprocket supporting member and the second sprocket supporting member includes a plurality of sprocket supporting arms.

26 Claims, 9 Drawing Sheets

BICYCLE SPROCKET ASSEMBLY

BACKGROUND

Field of the Invention

This invention generally relates to a bicycle sprocket assembly.

Background Information

Bicycling is becoming an increasingly more popular form of recreation, as well as a means of transportation. Moreover, bicycling has become a very popular competitive sport for both amateurs and professionals. Whether the bicycle is used for recreation, transportation or competition, the bicycle industry is constantly improving the various components of the bicycle. One area that has been extensively redesigned over the years is the bicycle drive train. Specifically, manufacturers of bicycle components have been continually improving shifting performance of the various shifting components, such as shifters, derailleurs, chain and sprockets.

One particular component of the bicycle drive train that has been extensively redesigned in the past years is the sprocket assembly.

SUMMARY

Generally, the present disclosure is directed to various features of a bicycle sprocket assembly.

In view of the state of the known technology and in accordance with a first aspect of the present disclosure, a bicycle sprocket assembly is basically provided that includes a sprocket support member. The sprocket support member includes a hub engagement portion, a first sprocket supporting member, and a second sprocket supporting member. The first sprocket supporting member extends from the hub engagement portion in a first axial direction parallel to a rotational center axis of the bicycle sprocket assembly. The second sprocket supporting member extends from the hub engagement portion in a second axial direction parallel to the rotational center axis. The second axial direction is opposite to the first axial direction. At least one of the first sprocket supporting member and the second sprocket supporting member includes a plurality of sprocket supporting arms. According to the first aspect of the present invention, a bicycle sprocket assembly is provided in which it is possible to reduce a total weight of the bicycle sprocket assembly.

In accordance with a second aspect of the present invention, the bicycle sprocket assembly according to the first aspect is configured so that the plurality of sprocket supporting arms are spaced apart from each other in a circumferential direction with respect to the rotational center axis. According to the second aspect of the present invention, a bicycle sprocket assembly is provided in which it is possible to reduce a total weight of the bicycle sprocket assembly.

In accordance with a third aspect of the present invention, the bicycle sprocket assembly according to the first or second aspect is configured so that each of the sprocket supporting arms has a proximal end and a distal end and the plurality of sprocket supporting arms extend so that the distal end is spaced further from the rotational center axis than the proximal end. According to the third aspect of the present invention, a bicycle sprocket assembly is provided in which it is possible to reduce a total weight of the bicycle sprocket assembly.

In accordance with a fourth aspect of the present invention, the bicycle sprocket assembly according to the first or second aspect is configured so that each of the sprocket supporting arms has a proximal end and a distal end and the plurality of sprocket supporting arms extend so that the proximal end is spaced further from the rotational center axis than the distal end. According to the fourth aspect of the present invention, a bicycle sprocket assembly is provided in which it is possible to reduce a total weight of the bicycle sprocket assembly.

In accordance with a fifth aspect of the present invention, the bicycle sprocket assembly according to the first aspect is configured so that the first sprocket supporting member includes a plurality of first sprocket supporting arms and the second sprocket supporting member includes a plurality of second sprocket supporting arms. According to the fifth aspect of the present invention, a bicycle sprocket assembly is provided in which it is possible to reduce a total weight of the bicycle sprocket assembly.

In accordance with a sixth aspect of the present invention, the bicycle sprocket assembly according to the fifth aspect is configured such that the plurality of first sprocket supporting arms are spaced apart from each other in a circumferential direction with respect to the rotational center axis and the plurality of second sprocket supporting arms are spaced apart from each other in the circumferential direction. According to the sixth aspect of the present invention, a bicycle sprocket assembly is provided in which it is possible to reduce a total weight of the bicycle sprocket assembly.

In accordance with a seventh aspect of the present invention, the bicycle sprocket assembly according to the fifth or sixth aspect is configured such that each of the first sprocket supporting arms has a first proximal end and a first distal end and each of the second sprocket supporting arms has a second proximal end and a second distal end. The plurality of first sprocket supporting arms extend so that the first distal end is spaced further from the rotational center axis than the first proximal end. The plurality of second sprocket supporting arms extend so that the second proximal end is spaced further from the rotational center axis than the second distal end. According to the seventh aspect of the present invention, a bicycle sprocket assembly is provided in which it is possible to reduce a total weight of the bicycle sprocket assembly.

In accordance with an eighth aspect of the present invention, the bicycle sprocket assembly according to any one of the first to seventh aspects is configured such that the sprocket support member is made of a non-metallic material. According to the eighth aspect of the present invention, a bicycle sprocket assembly is provided in which it is possible to reduce a total weight of the bicycle sprocket assembly.

In accordance with a ninth aspect of the present invention, the bicycle sprocket assembly according to the eighth aspect is configured so that the non-metallic material includes fiber reinforced plastic. According to the ninth aspect of the present invention, a bicycle sprocket assembly is provided in which it is possible to reduce a total weight of the bicycle sprocket assembly while maintaining sufficient rigidity.

In accordance with a tenth aspect of the present invention, the bicycle sprocket assembly according to any one of the first to seventh aspects is configured so that the sprocket support member is made of a metallic material. According to the tenth aspect of the present invention, a bicycle sprocket assembly is provided in which it is possible to maintain sufficient rigidity of the bicycle sprocket assembly.

In accordance with an eleventh aspect of the present invention, the bicycle sprocket assembly according to the tenth aspect is configured such that the metallic material includes aluminum alloy. According to the eleventh aspect of the present invention, a bicycle sprocket assembly is provided in which it is possible to reduce a total weight of the bicycle sprocket assembly while maintaining sufficient rigidity.

In accordance with a twelfth aspect of the present invention, the bicycle sprocket assembly according to any one of the first to eleventh aspects is configured such that the hub engagement portion has a radially inner peripheral surface and a radially outer peripheral surface, and a hub engagement profile formed on the radially inner peripheral surface. According to the twelfth aspect of the present invention, a bicycle sprocket assembly is provided in which it is possible to provide a light-weight bicycle sprocket assembly.

In accordance with a thirteenth aspect of the present invention, the bicycle sprocket assembly according to the twelfth aspect is configured such that the hub engagement profile includes a plurality of splines. According to the thirteenth aspect of the present invention, a bicycle sprocket assembly is provided in which it is possible to effectively transmit torque from the bicycle sprocket assembly to a hub assembly.

In accordance with a fourteenth aspect of the present invention, the bicycle sprocket assembly according to twelfth or thirteenth aspect is configured such that the radially outer peripheral surface is configured to support at least one bicycle sprocket. According to the fourteenth aspect of the present invention, a bicycle sprocket assembly is provided in which it is possible to sufficiently support a light-weight bicycle sprocket assembly.

In accordance with a fifteenth aspect of the present invention, the bicycle sprocket assembly according to any of the second to fourth aspects is configured such that each of the sprocket supporting arms has a plurality of radially extending parts and a plurality of axially extending parts. The plurality of radially extending parts and the plurality of axially extending parts are alternately arranged in an axial direction parallel to the rotational center axis. According to the fifteenth aspect of the present invention, a bicycle sprocket assembly is provided in which it is possible to sufficiently support a plurality of sprockets on a sprocket supporting member.

In accordance with a sixteenth aspect of the present invention, the bicycle sprocket assembly according to any of the fifth to seventh aspects is configured such that each of the first sprocket supporting arms has a plurality of first radially extending parts and a plurality of first axially extending parts and each of the second sprocket supporting arms has a plurality of second radially extending parts and a plurality of second axially extending parts. The plurality of first radially extending parts and the plurality of first axially extending parts are alternately arranged in an axial direction parallel to the rotational center axis. The plurality of second radially extending parts and the plurality of second axially extending parts are alternately arranged in an axial direction parallel to the rotational center axis. According to the sixteenth aspect of the present invention, a bicycle sprocket assembly is provided in which it is possible to sufficiently support a plurality of sprockets on a sprocket supporting member.

In accordance with a seventeenth aspect of the present invention, the bicycle sprocket assembly according to any of the second to fourth and fifteenth aspects is configured such that each of the sprocket supporting arms has a proximal end and a distal end. The distal end is configured to be spaced apart from a bicycle hub assembly in a radial direction with respect to the rotational center axis in a state where the bicycle sprocket assembly is mounted to the bicycle hub assembly. According to the seventeenth aspect of the present invention, a bicycle sprocket assembly is provided in which it is possible to reduce a total weight of the bicycle sprocket assembly.

In accordance with an eighteenth aspect of the present invention, the bicycle sprocket assembly according to any one of the fifth to seventh and sixteenth aspects is configured such that each of the first sprocket supporting arms has a first proximal end and a first distal end and each of the second sprocket supporting arms has a second proximal end and a second distal end. The first distal end is configured to be spaced apart from a bicycle hub assembly in a radial direction with respect to the rotational center axis in a state where the bicycle sprocket assembly is mounted to the bicycle hub assembly. The second proximal end is configured to be spaced apart from a bicycle hub assembly in a radial direction with respect to the rotational center axis in a state where the bicycle sprocket assembly is mounted to the bicycle hub assembly. According to the eighteenth aspect of the present invention, a bicycle sprocket assembly is provided in which it is possible to reduce a total weight of the bicycle sprocket assembly.

In accordance with a nineteenth aspect of the present invention, the bicycle sprocket assembly according to any one of the second to fourth, fifteenth and seventeenth aspects is configured such that each of the plurality of sprocket supporting arms has a radially inner peripheral surface and a radially outer peripheral surface. The radially outer peripheral surface is configured to support at least one bicycle sprocket. According to the nineteenth aspect of the present invention, a bicycle sprocket assembly is provided in which it is possible to effectively support a bicycle sprocket on a sprocket supporting member.

In accordance with a twentieth aspect of the present invention, the bicycle sprocket assembly according to the nineteenth aspect is configured such that at least one reinforcement portion is provided to the radially inner peripheral surface. According to the twentieth aspect of the present invention, a bicycle sprocket assembly is provided in which it is possible to enhance rigidity of a sprocket supporting member.

In accordance with a twenty-first aspect of the present invention, the bicycle sprocket assembly according to any one of the fifth to seventh, sixteenth and eighteenth aspects is configured such that each of the plurality of first sprocket supporting arms has a first radially inner peripheral surface and a first radially outer peripheral surface and each of the plurality of second sprocket supporting arms has a second radially inner peripheral surface and a second radially outer peripheral surface. The first radially outer peripheral surface is configured to support at least one bicycle sprocket. The second radially outer peripheral surface is configured to support at least one bicycle sprocket. According to the twenty-first aspect of the present invention, a bicycle sprocket assembly is provided in which it is possible to effectively support a bicycle sprocket on a sprocket mounting member.

In accordance with a twenty-second aspect of the present invention, the bicycle sprocket assembly according to the twenty-first aspect is configured such that at least one reinforcement portion is provided to at least one of the first radially inner peripheral surface and the second radially inner peripheral surface. According to the twenty-second aspect of the present invention, a bicycle sprocket assembly is provided in which it is possible to enhance rigidity of a sprocket supporting member.

In accordance with a twenty-third aspect of the present invention, the bicycle sprocket assembly according to any one of the first to twenty-second aspects is configured to include a plurality of bicycle sprockets. A tooth-number difference between a smallest sprocket of the plurality of bicycle sprockets and a largest sprocket of the plurality of bicycle sprockets is equal to or greater than twenty-five. According to the twenty-third aspect of the present invention, a bicycle sprocket assembly is provided in which it is possible to provide a bicycle sprocket assembly having a wide gear ratio.

In accordance with a twenty-fourth aspect of the present invention, the bicycle sprocket assembly according to any one of the first to twenty-second aspects is configured to include a plurality of bicycle sprockets. A tooth-number difference between a smallest sprocket of the plurality of bicycle sprockets and a largest sprocket of the plurality of bicycle sprockets is equal to or greater than thirty-five. According to the twenty-fourth aspect of the present invention, a bicycle sprocket assembly is provided in which it is possible to provide a bicycle sprocket assembly having a wide gear ratio.

In accordance with a twenty-fifth aspect of the present invention, the bicycle sprocket assembly according to any one of the first to twenty-fourth aspects is configured to include a plurality of bicycle sprockets. A largest sprocket of the plurality of bicycle sprockets has a total tooth number that is equal to or greater than forty-four. According to the twenty-fifth aspect of the present invention, a bicycle sprocket assembly is provided in which it is possible to provide a bicycle sprocket assembly having a wide gear ratio.

In accordance with a twenty-sixth aspect of the present invention, the bicycle sprocket assembly according to any one of the first to twenty-fifth aspects is configured to include a plurality of bicycle sprockets. A smallest sprocket of the plurality of bicycle sprockets has a total tooth number that is equal to or fewer than ten. According to the twenty-sixth aspect of the present invention, a bicycle sprocket assembly is provided in which it is possible to provide a bicycle sprocket assembly having a wide gear ratio.

Also other objects, features, aspects and advantages of the disclosed bicycle sprocket assembly will become apparent to those skilled in the art from the following detailed description, which, taken in conjunction with the annexed drawings, discloses exemplary embodiments of the bicycle sprocket assembly.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
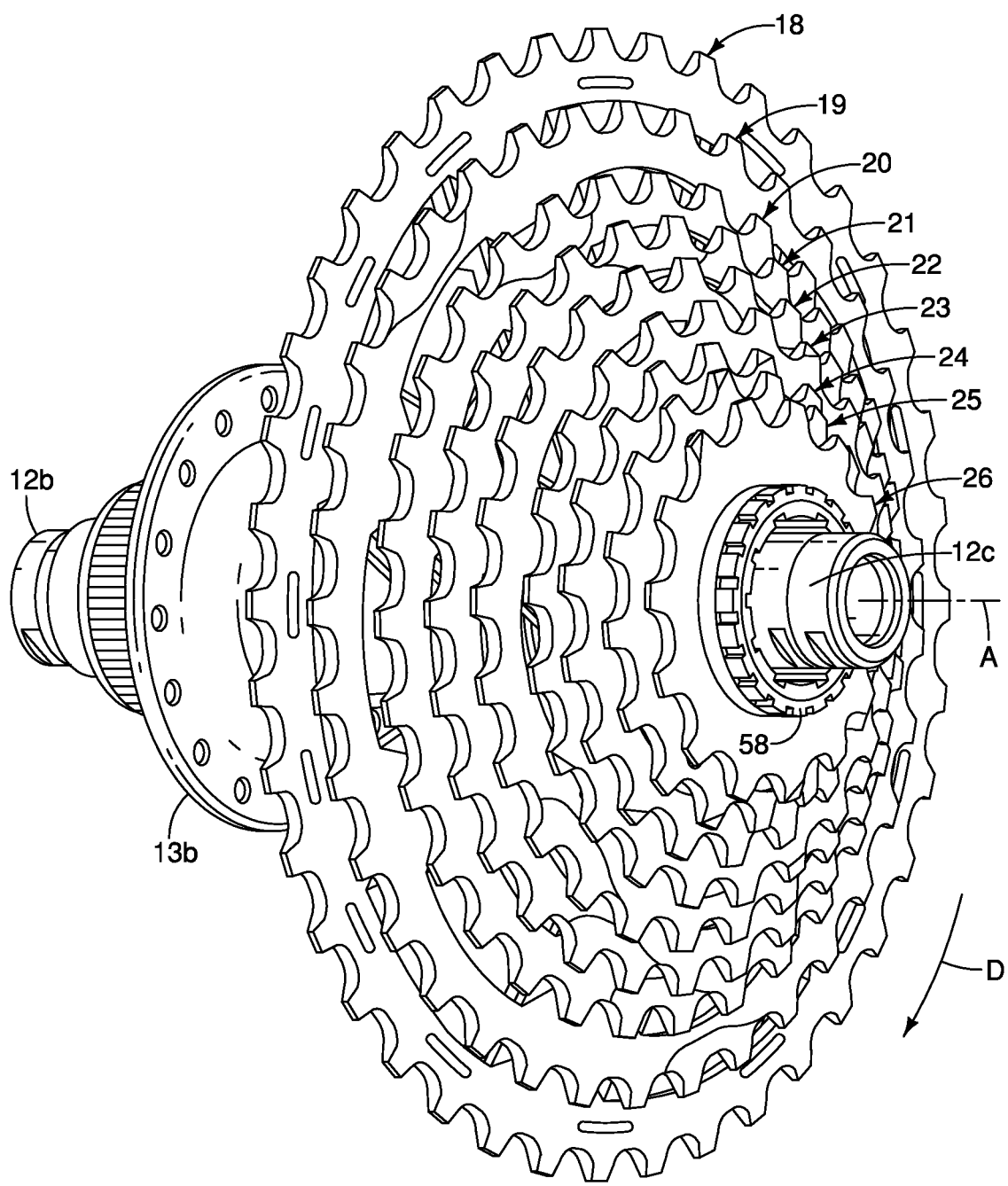
FIG. 1 is a perspective view of a bicycle rear sprocket assembly mounted to a bicycle rear hub assembly in accordance with one illustrated embodiment.
Figure 2:
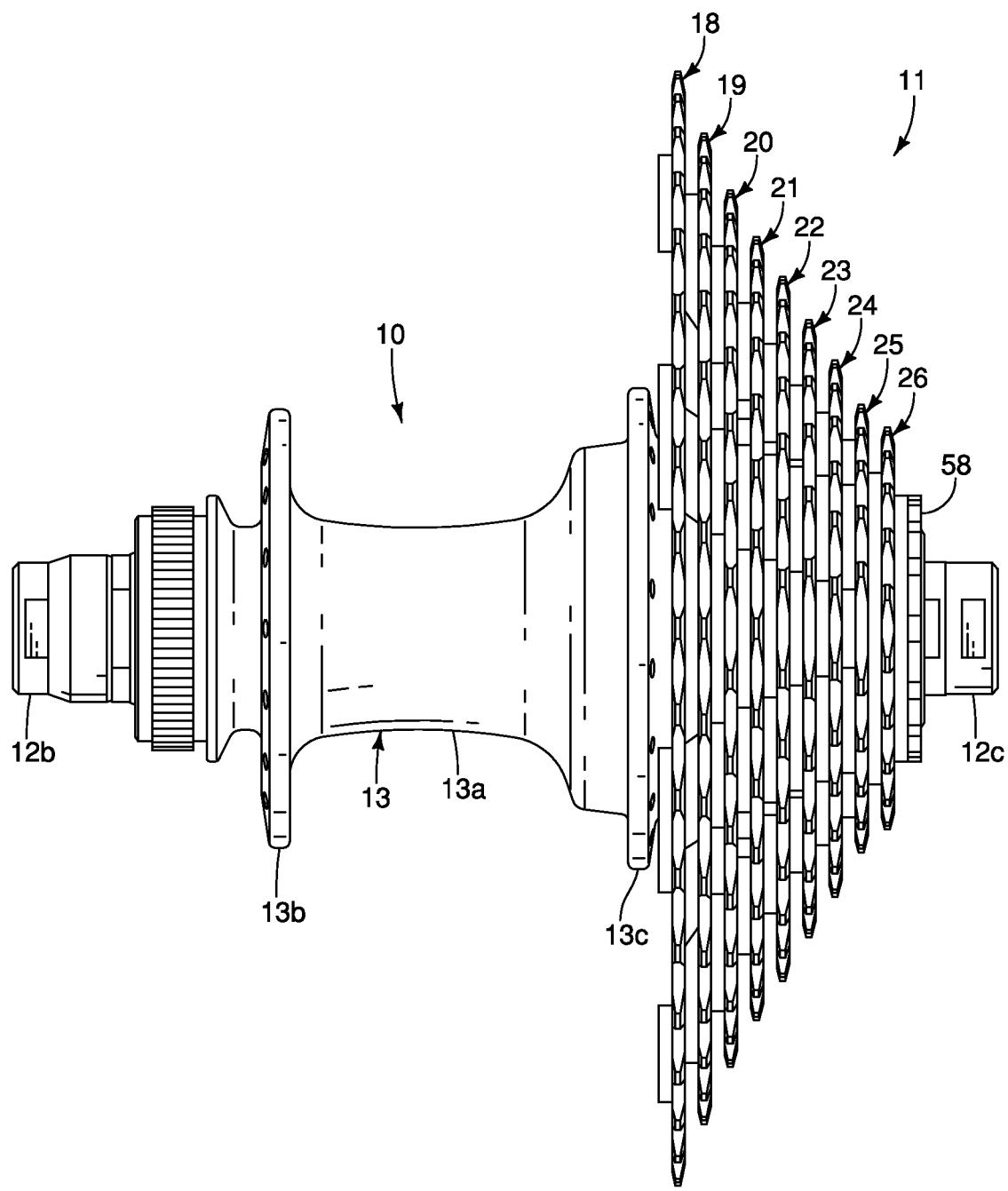
FIG. 2 is a rear elevational view of the rear hub assembly and the rear sprocket assembly of FIG. 1.

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention. It will be apparent to those skilled in the bicycle field from this disclosure that a bicycle rear sprocket assembly in accordance with the exemplary embodiments of the present invention can have a different number of sprockets.

Referring initially to FIGS. 1 to 4, a bicycle rear hub assembly 10 is illustrated to which a bicycle rear sprocket assembly 11 in accordance with a first exemplary embodiment is mounted. The bicycle rear hub assembly 10 basically comprises a hub axle 12 and a hub shell 13. The hub axle 12 is a conventional member having a shaft portion 12a with a first end cap 12b connected to a first end of the hub axle 12 and a second end cap 12c connected to a second end of the hub axle 12. The hub axle 12 defines a rotational center axis A. The hub shell 13 is rotatably mounted on the hub axle 12 to rotate around the rotational center axis A. The hub shell 13 has a center tubular body 13a and a pair of spoke attachment flanges 13b and 13c extending outwardly in a radial direction from the center tubular body 13a.

Figure 3:
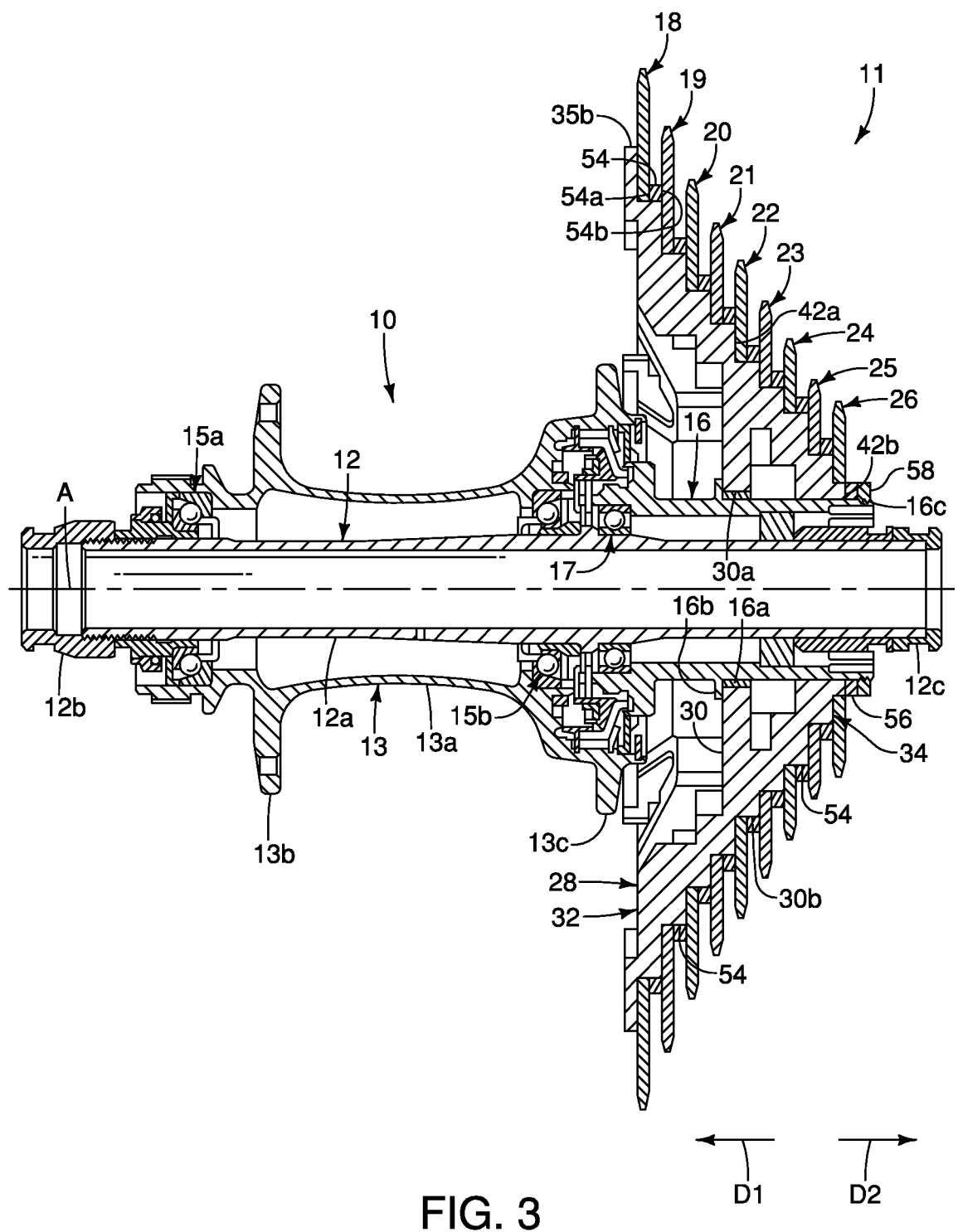
FIG. 3 is a rear elevational view in cross section of the rear hub assembly and the rear sprocket assembly of FIG. 2.
Figure 4:
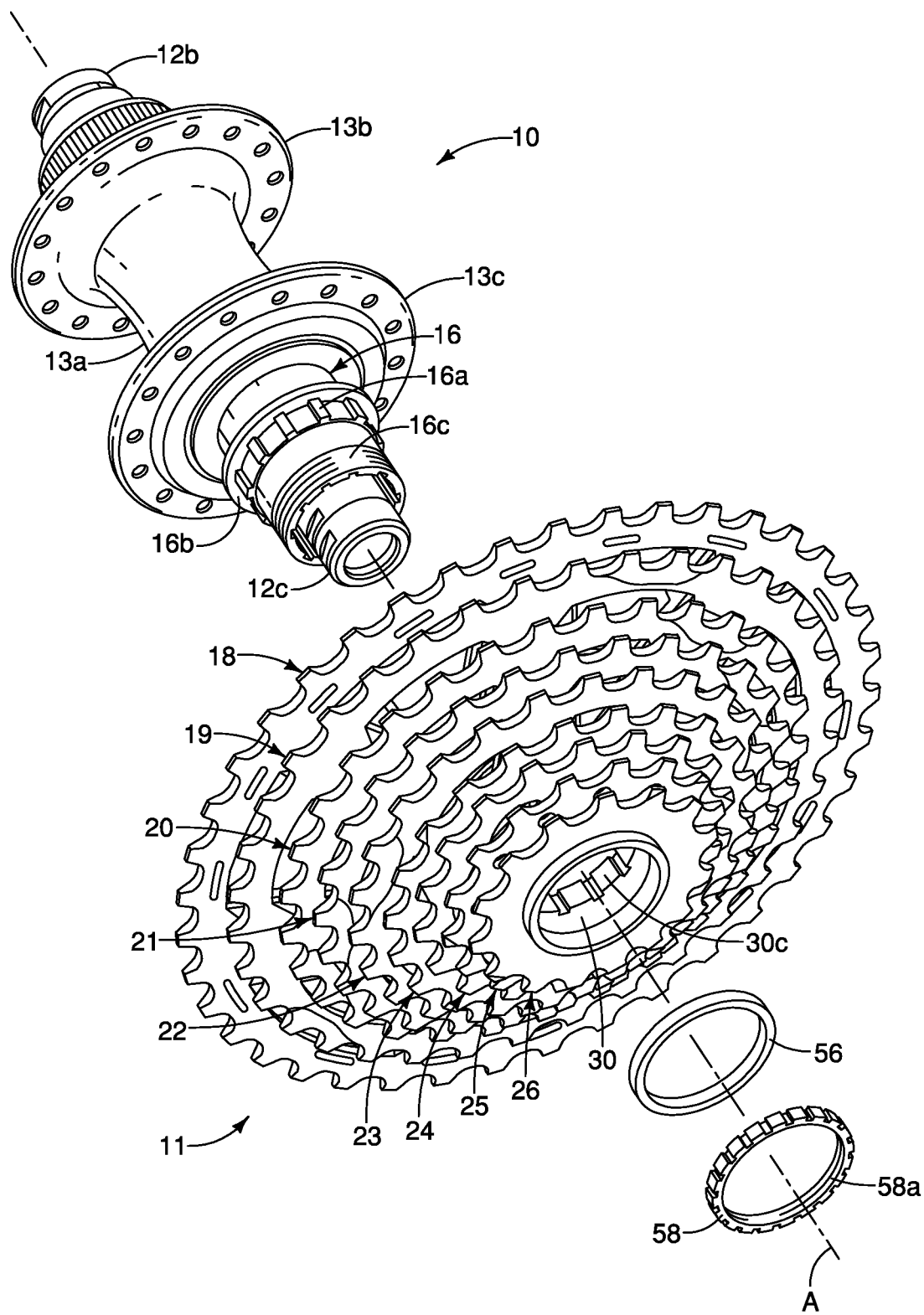
FIG. 4 is an exploded perspective view of the rear hub assembly and the rear sprocket assembly of FIG. 1.

As shown in FIG. 3, at least one bearing assembly is provided for rotatably supporting the hub shell 13 on the hub axle 12. In the illustrated exemplary embodiment, the hub shell 13 is rotatably mounted on the hub axle 12 by a pair of bearing assemblies 15a and 15b. The bearing assemblies 15a and 15b are conventional parts that are well known in the bicycle field, and thus, the bearing assemblies 15a and 15b will not be discussed any or illustrated in detail herein. Also, other bearing arrangements can be used as needed and/or desired.

Referring now to FIG. 3, the bicycle rear hub assembly 10 further comprises a sprocket support body 16. At least one bearing assembly 17 is provided for rotatably supporting the sprocket support body 16 on the hub axle 12. In the illustrated exemplary embodiment, the sprocket support body 16 is rotatably mounted on the hub axle 12 by the bearing assembly 17, although any suitable number of bearing assemblies can be used. Coasting or freewheeling occurs when the sprocket support body 16 stops rotating or moves in a non-driving rotational direction (i.e., counterclockwise about the rotational center axis A as viewed from the sprocket support body side of the bicycle rear hub assembly 10) while the hub shell 13 rotates in a driving rotational direction (i.e., clockwise about the rotational center axis A as viewed from the sprocket support body side of the bicycle rear hub assembly 10).

Referring to FIGS. 1 to 8, a bicycle rear sprocket assembly 11 is illustrated in accordance with a first exemplary embodiment of the present invention. As shown in FIGS. 1 to 4, the bicycle rear sprocket assembly 11 includes nine sprockets 18 to 26. The sprockets 18 to 26 are axially spaced from each other at predetermined intervals. The sprockets 18 to 26 are configured to be fixedly mounted on the bicycle rear hub assembly 10 such that the sprockets 18 to 26 are configured to rotate together about the rotational center axis A. The sprockets 18 to 26 typically rotate together in a forward rotational direction D (e.g., in a clockwise direction as viewed in FIG. 1) when the rider is pedaling in a forward (clockwise) direction to propel the bicycle in a forward direction. It will be apparent to those skilled in the bicycle art from this disclosure that the bicycle rear sprocket assembly can have fewer or more sprockets.

As shown in FIGS. 1 to 4, the sprockets 18 to 26 are hard, rigid disc shaped members formed from a suitable material, such as a metallic material. In the illustrated exemplary embodiment, the sprockets 18 to 26 are each a one-piece, unitary member formed of a metallic material that is suitable for a bicycle sprocket. The sprockets 18 to 26 can include modified teeth, such as teeth having inclined surfaces, and/or recesses to facilitate downshifting and upshifting operations.

Figure 5:
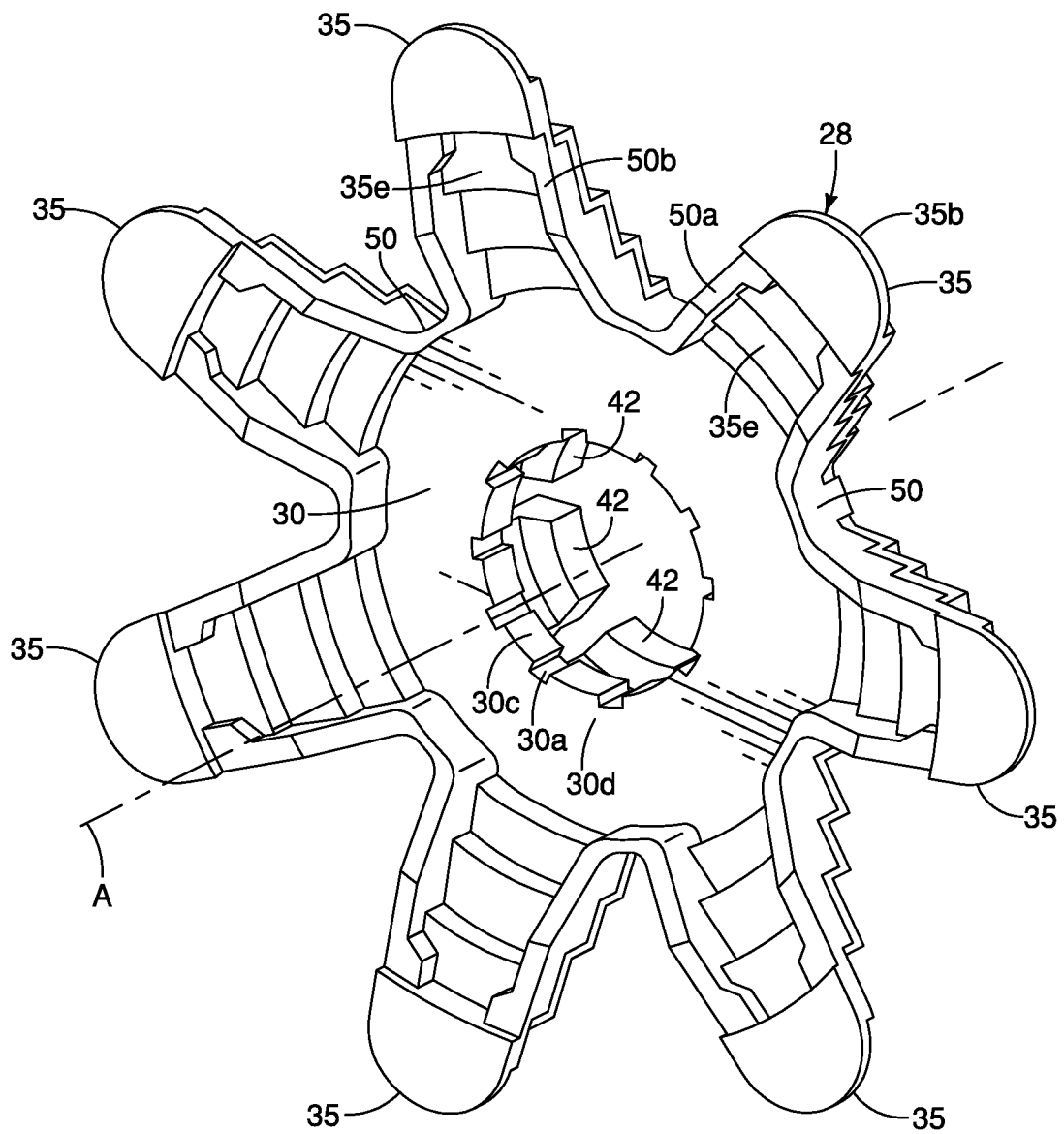
FIG. 5 is a rear perspective view of a sprocket support member of the rear hub assembly of FIG. 4.
Figure 6:
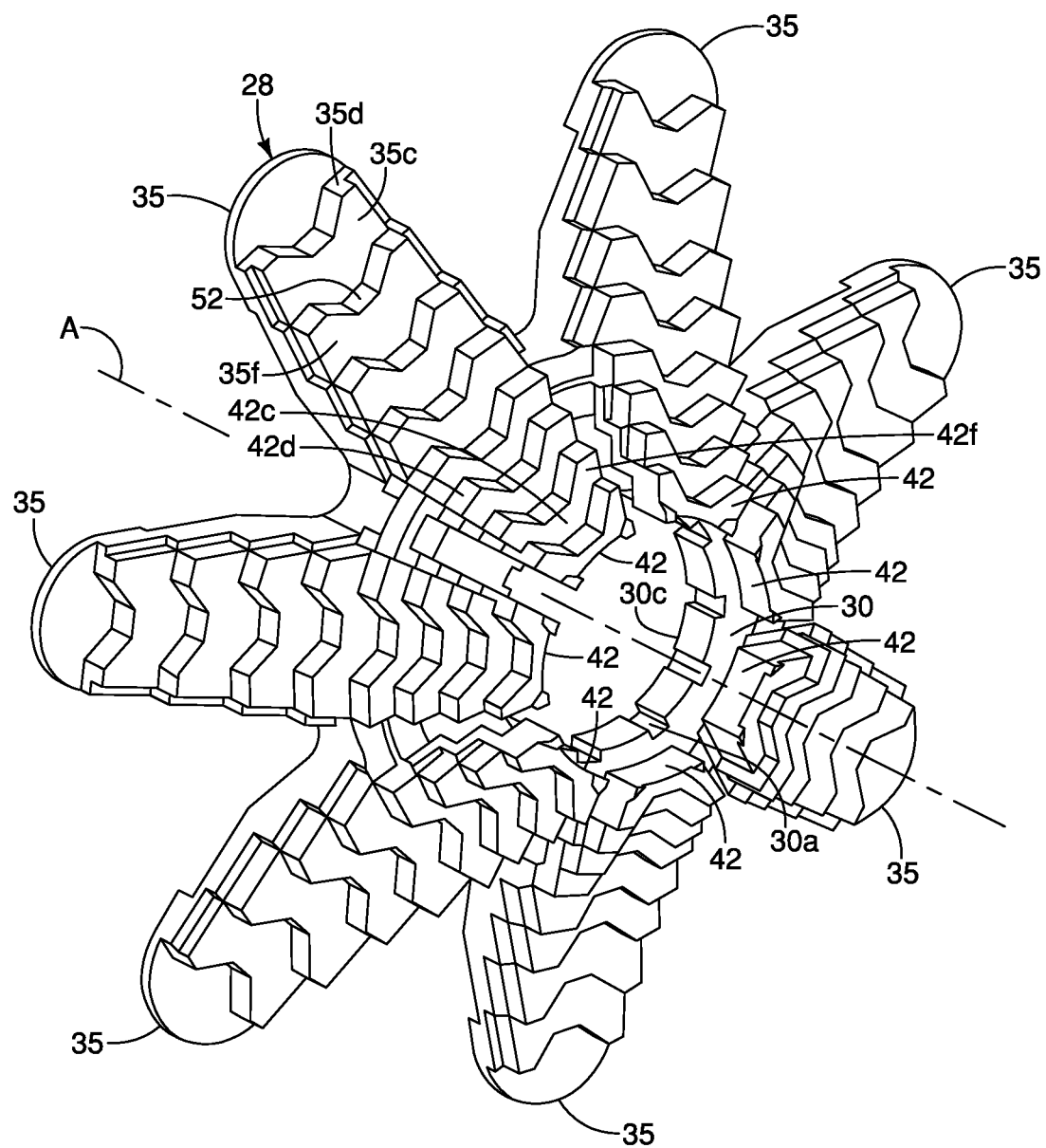
FIG. 6 is a front perspective view of the sprocket support member of the rear hub assembly of FIG. 5.
Figure 7:
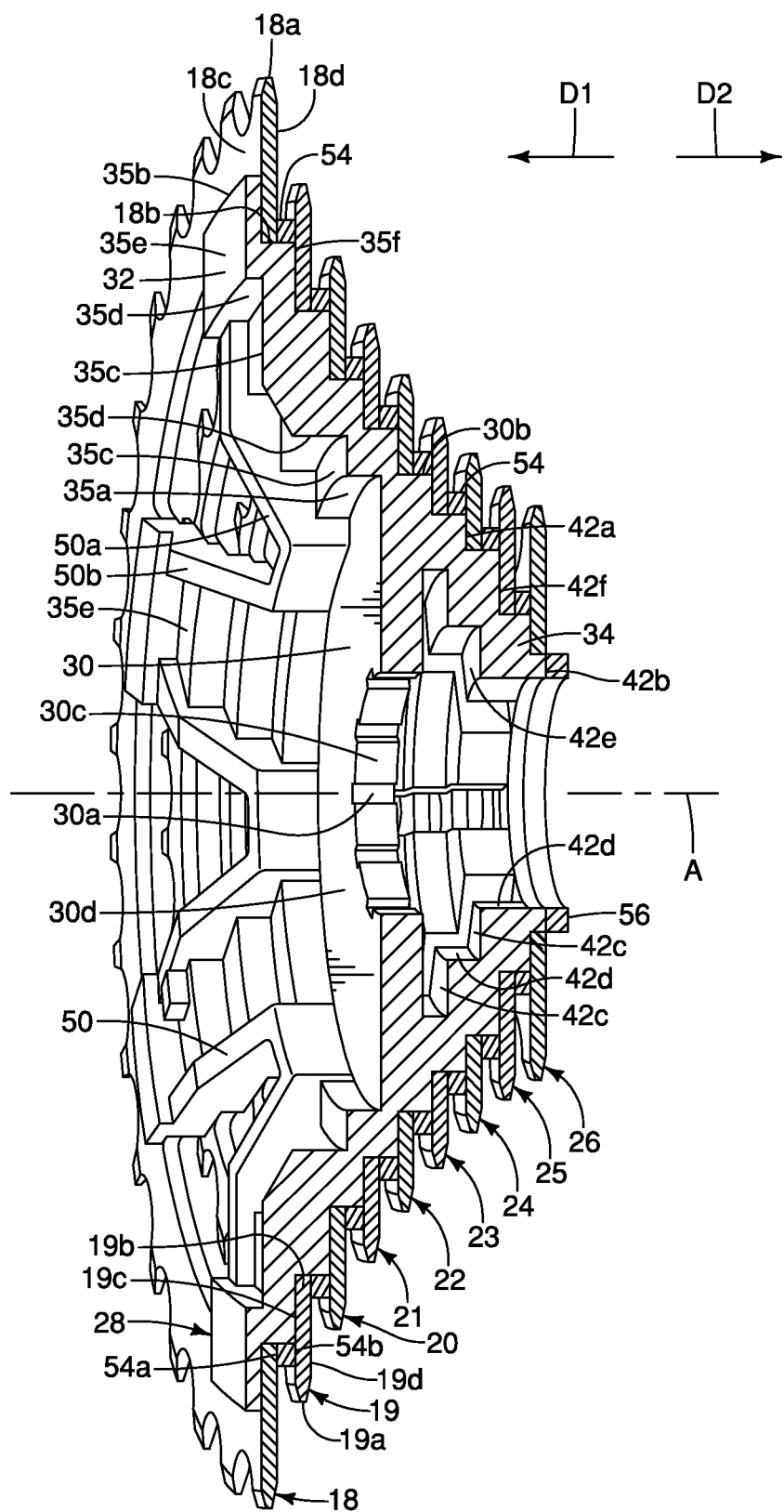
FIG. 7 is a partial rear perspective view in cross section of the bicycle rear sprocket assembly of FIG. 2 in which a sprocket support member is made of a metallic material.
Figure 8:
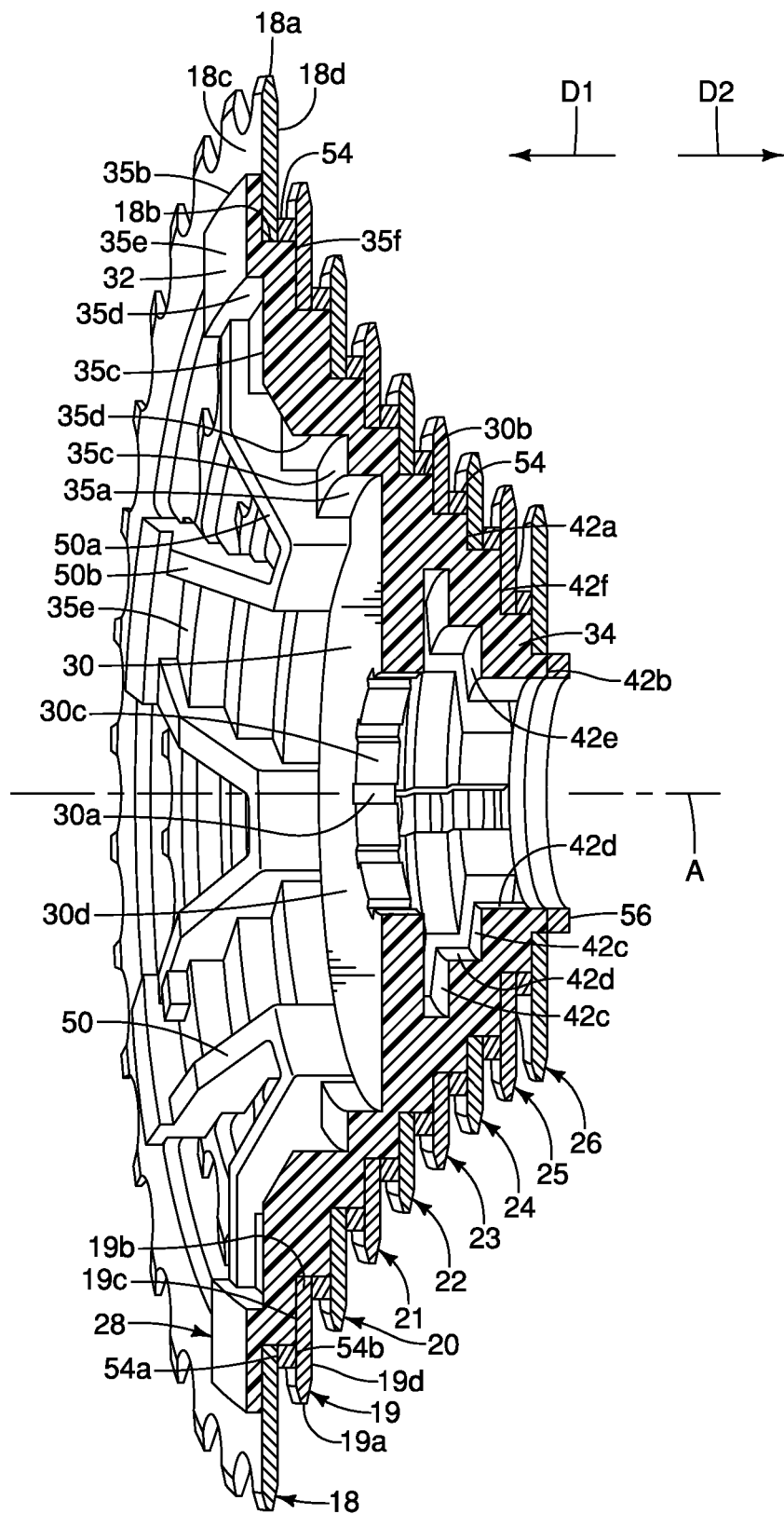
FIG. 8 is a partial rear perspective view in cross section of the bicycle rear sprocket assembly of FIG. 2 in which a sprocket support member is made of a non-metallic material.

As shown in FIGS. 3, 5 and 6, the bicycle sprocket assembly 11 includes a sprocket support member 28 configured to support the plurality of sprockets 18 to 26. The sprocket support member 28 includes a hub engagement portion 30 configured to engage the bicycle rear hub assembly 10. As shown in FIGS. 3, 7 and 8, the hub engagement portion 30 includes a radially inner peripheral surface 30a and a radially outer peripheral surface 30b. A hub engagement profile 30c is formed on the radially inner peripheral surface 30a, as shown in FIGS. 7 and 8. An abutment surface 30d extends radially outwardly with respect to the rotational center axis A. The radially outer peripheral surface 30b is configured to support at least one bicycle sprocket, such as sprocket 22. The hub engagement profile 30c facilitates the transfer of torque from the bicycle rear sprocket assembly 11 to the bicycle rear hub assembly 10. Preferably, the hub engagement profile 30c formed on the radially inner peripheral surface 30a of the hub engagement portion 30 includes a plurality of splines configured to engage a corresponding splined portion 16a of the bicycle rear hub assembly 10. The splined portion 16a can be a splined ring disposed on the sprocket support body 16. Alternatively, the splined portion can be configured in any suitable manner to engage the splined radially inner peripheral surface 30a of the hub engagement portion 30 of the sprocket support member 28. Accordingly, torque is transmitted from the bicycle rear sprocket assembly 11 to the bicycle rear hub assembly 10 through the splined connection between the hub engagement portion 30 and the sprocket support body 16. The abutment surface 30d abuts an abutment member 16b of the bicycle rear hub assembly 10 when the hub engagement profile 30c is engaged with the splined portion 16a of the bicycle rear hub assembly 10.

The sprocket support member 28 includes a first sprocket supporting member 32 and a second sprocket supporting member 34, as shown in FIGS. 3 and 5 through 8. The first sprocket supporting member 32 extends from the hub engagement portion 30 in a first axial direction D1 parallel to the rotational center axis A of the bicycle sprocket assembly 11. The second sprocket supporting member 34 extends from the hub engagement portion 30 in a second axial direction D2 parallel to the rotational center axis A. The second axial direction D2 is opposite to the first axial direction D1.

As shown in FIGS. 5 and 6, at least one of the first sprocket supporting member 32 and the second sprocket supporting member 34 includes a plurality of sprocket supporting arms, such as first sprocket supporting arms 35 or second sprocket supporting arms 42. The plurality of sprocket supporting arms, such as the first sprocket supporting arms 35 or the second sprocket supporting arms 42, are spaced apart from each other in a circumferential direction with respect to the rotational center axis A. Each of the sprocket supporting arms has a proximal end and a distal end. For example, each of the first sprocket supporting arm 35 has a proximal end 35a and a distal end 35b and each of the second sprocket supporting arm 42 has a proximal end 42a and a distal end 42b, as shown in FIGS. 7 and 8. The plurality of sprocket supporting arms extend so that the distal end is spaced further from the rotational center axis A than the proximal end, such as the first distal end 35b of the first sprocket supporting arms 35 being spaced further from the rotational center axis A than the first proximal end 35a. Additionally or alternatively, the plurality of sprocket supporting arms extend so that the proximal end is spaced further from the rotational center axis A than the distal end, such as the second proximal end 42a of the sprocket supporting arms 42 being spaced further from the rotational center axis A than the second distal end 42b.

Each of the sprocket supporting arms has a plurality of radially extending parts, such as first and second radially extending parts 35c and 42c of the first and second sprocket supporting arms 35 and 42, respectively, and a plurality of first axially extending parts, such as first and second axially extending parts 35d and 42d of the first and second sprocket supporting arms 35 and 42, respectively. The plurality of radially extending parts and the plurality of axially extending parts are alternately arranged in an axial direction parallel to the rotational center axis A. As shown in FIGS. 7 and 8, the alternately arranged radially extending parts and the axially extending parts provide a plurality of steps configured to support the plurality of bicycle sprockets. The first radially extending parts 35c and the first axially extending parts 35d are alternately arranged in the first axial direction D1 from the hub engaging portion 30 to form a plurality of steps configured to support the plurality of sprockets, such as sprockets 18 to 21. The second radially extending parts 42c and the second axially extending parts 42d are alternately arranged in the second axial direction D2 from the hub engaging portion 30 to form a plurality of steps configured to support the plurality of sprockets, such as sprockets 23 to 26.

The distal end, such as the first distal end 35b, is configured to be spaced apart from the bicycle hub assembly 10 in a radial direction with respect to the rotational center axis A in a state where the bicycle sprocket assembly 11 is mounted to the bicycle hub assembly 10, as shown in FIG. 3. The first distal end 35b of each of the first sprocket supporting arms 35 is spaced apart from the sprocket support body 16 in the radial direction with respect to the rotational center axis A. The second distal end 42b of each of the second sprocket supporting arms 42 is preferably disposed on the sprocket support body 16 when the bicycle sprocket assembly 11 is mounted to the bicycle hub assembly 10.

Preferably, as shown in FIGS. 5 and 6, the first sprocket supporting member 32 includes a plurality of first sprocket supporting arms 35 and the second sprocket supporting member 34 includes a plurality of second sprocket supporting arms 42. The first and second sprocket supporting members 32 and 34 are shown including seven first sprocket supporting arms 35 and seven second sprocket supporting arms 42, although the sprocket supporting members can include any suitable number of sprocket supporting arms.

Each of the first sprocket supporting arms 35 has a first proximal end 35a and a first distal end 35b, as shown in FIGS. 7 and 8. The plurality of first sprocket supporting arms 35 extend so that the first distal end 35b is spaced further from the rotational center axis A than the first proximal end 35a. The first distal end 35b is configured to be spaced apart from the bicycle hub assembly 10 in the radial direction with respect to the rotational center axis A in a state where the bicycle sprocket assembly 11 is mounted to the bicycle hub assembly 10. As shown in FIGS. 5 and 6, the plurality of first sprocket supporting arms 35 are spaced from each other in a circumferential direction with respect to the rotational center axis A.

As shown in FIGS. 7 and 8, each of the first sprocket supporting arms 35 has a plurality of first radially extending parts 35c and a plurality of first axially extending parts 35d. The plurality of first radially extending parts 35c and the plurality of first axially extending parts 35d are alternately arranged in an axial direction parallel to the rotational center axis A. The alternately arranged first radially extending parts 35c and the first axially extending parts 35d provide a plurality of steps configured to support the plurality of bicycle sprockets. The first radially extending parts 35c and the first axially extending parts 35d are alternately arranged in the first axial direction D1 from the hub engaging portion 30 to form a plurality of steps configured to support the plurality of sprockets, such as sprockets 18 to 21.

Each of the second sprocket supporting arms 42 has a second proximal end 42a and a second distal end 42b, as shown in FIG. 7. The plurality of second sprocket supporting arms 42 extend so that the second proximal end 42a is spaced further from the rotational center axis A than the second distal end 42b. The second proximal end 42a is configured to be spaced apart from the bicycle hub assembly 10 in the radial direction with respect to the rotational center axis A in a state where the bicycle sprocket assembly 11 is mounted to the bicycle hub assembly 10. As shown in FIGS. 5 and 6, the plurality of second sprocket supporting arms 42 are spaced from each other in a circumferential direction with respect to the rotational center axis A.

As shown in FIGS. 7 and 8, each of the second sprocket supporting arms 42 has a plurality of second radially extending parts 42c and a plurality of second axially extending parts 42d. The plurality of second radially extending parts 42c and the plurality of second axially extending parts 42d are alternately arranged in an axial direction parallel to the rotational center axis A. The alternately arranged second radially extending parts 42c and the second axially extending parts 42d provide a plurality of steps configured to support the plurality of bicycle sprockets. The second radially extending parts 42c and the second axially extending parts 42d are alternately arranged in the second axial direction D2 from the hub engaging portion 30 to form a plurality of steps configured to support the plurality of sprockets, such as sprockets 23 to 26.

As shown in FIGS. 5 to 8, each of the plurality of sprocket supporting arms, such as the first and second sprocket supporting arms 35 and 42, has a radially inner peripheral surface and a radially outer peripheral surface. Each of the plurality of first sprocket supporting arms 35 has a first radially inner peripheral surface 35e and a first radially outer peripheral surface 35f. Each of the plurality of second sprocket supporting arms 42 has a second radially inner peripheral surface 42e and a second radially outer peripheral surface 42f. The radially outer peripheral surface, such as the first radially outer peripheral surface 35f and the second radially outer peripheral surface 42f, is configured to support at least one bicycle sprocket. The first radially outer peripheral surface 35f is configured to support at least one bicycle sprocket, such as sprocket 19 shown in FIGS. 7 and 8. The second radially outer peripheral surface 42f is configured to support at least one bicycle sprocket, such as sprocket 25 shown in FIGS. 7 and 8.

As shown in FIGS. 7 and 8, at least one reinforcement portion 50 is provided to the radially inner peripheral surface, such as the first radially inner peripheral surface 35e of the first sprocket supporting arm 35 or the second radially inner peripheral surface 42e of the second sprocket supporting arm 42, to enhance the rigidity of the sprocket support member 28. Preferably, at least one reinforcement portion 50 is provided to at least one of the first radially inner peripheral surface 35e and the second radially inner peripheral surface 42e. As illustrated in FIGS. 5, 7 and 8, a plurality of reinforcement portions 50 are provided to the first radially inner peripheral surfaces of the plurality of first sprocket supporting arms 35. Seven reinforcement portions 50 are provided, although any suitable number of reinforcement portions can be used.

Referring to FIG. 5, each reinforcement portion 50 is substantially U-shaped and disposed between adjacent first sprocket supporting arms 35. A reinforcement portion 50 is disposed between adjacent first sprocket supporting arms 35. A first part 50a of the reinforcement portion 50 is provided to one of the first radially inner peripheral surface 35e of the first sprocket supporting arm 35, and a second part 50b of the reinforcement portion 50 is provided to the other of the first radially inner peripheral surface 35e of the first sprocket supporting arm 35. The reinforcement portions 50 are similarly disposed between the remaining first sprocket supporting arms 35. Alternatively, the reinforcement portions 50 can be disposed to the second radially inner peripheral surfaces between adjacent second sprocket supporting arms 42.

As shown in FIG. 7, the sprocket support member 28 is made of a metallic material. The metallic material includes aluminum alloy. Alternatively, as shown in FIG. 8, the sprocket support member 28 is made of a non-metallic material. The non-metallic material includes fiber reinforced plastic.

Referring now to FIGS. 3, 7 and 8, the sprocket 18 basically has a sprocket body and a plurality of sprocket teeth 18a provided to an outer periphery of the sprocket body. The plurality of teeth 18a are circumferentially spaced and extend radially and outwardly from the outer periphery of the sprocket body. The center of the sprocket 18 is provided with a sprocket attachment portion 18b that is configured to be mounted on sprocket support member 28. The sprocket body has a first axial side or large sprocket side 18c that faces the spoke attachment flange 13c (i.e., an inbound direction) and a second axial side or small sprocket side 18d that faces the next smaller sprocket (sprocket 19, i.e., an outbound direction). Each of the plurality of sprockets 18 to 26 is substantially similarly configured, such that a description thereof is omitted. For example, as shown in FIG. 3, the sprocket 19 is similarly configured to have a plurality of teeth 19a, a sprocket attachment portion 19b, a first axial side 19c and a second axial side 19d.

Referring to FIG. 6, a cutout 52 is formed in each of the first and second radially extending parts 35c and 42c of the first and second sprocket supporting arms 35 and 42, respectively. The cutout 52 can have any suitable shape, such as the substantially flat bottom V-shape illustrated in FIG. 6. The cutout 52 extends from one radially extending part to the adjacent radially extending part in the axial direction. As shown in FIGS. 3, 7 and 8, each cutout 52 is configured to receive an insert 54 to facilitate spacing adjacent sprockets and rigidly securing the sprockets to the sprocket support member 28. The inserts 54 are configured to be disposed between adjacent sprockets, thereby properly spacing adjacent sprockets. Thus, for the nine-sprocket configuration illustrated in FIGS. 1 to 8, eight inserts are disposed along the first and second sprocket supporting arms 35 and 42 and the hub engaging portion 30.

As shown in FIGS. 3, 7 and 8, each of the sprockets 18 to 26 is mounted on one of the first or second sprocket supporting members 32 or 34 or the hub engagement portion 30. The sprocket 18 is disposed on the first sprocket supporting member 32 such that the sprocket attachment portion 18b is received by the first axially extending parts 35d of the plurality of first sprocket supporting arms 35 of the first sprocket supporting member 32. A first axial side 18c of the sprocket 18 abuts a first radially extending part 35c. A second axial side 18d of the sprocket 18 abuts a first side 54a of the insert 54. Adhesive is disposed between the second axial sides (contacting sides) 18d of the sprocket 18 and the first sides 54a of the insert 54, respectively, to facilitate rigidly securing the sprocket 18 to the sprocket supporting member 26. Alternative or additional means of securing the sprocket 18 to the sprocket support member 28 can be used, such as diffusion bonding or rivets.

The sprocket 19 is disposed on the first sprocket supporting member 32 such that the sprocket attachment portion 19b is received by the first axially extending parts 35d of the plurality of first sprocket supporting arms 35 of the first sprocket supporting member 32. A first axial side 19c of the sprocket 19 abuts a first radially extending part 35c and the second side 54b of the insert 54. A second axial side 19d of the sprocket 19 abuts a first side 54a of another insert 54. Adhesive is disposed between the first axial side 19c and the second axial side 19d (contacting sides) of the sprocket 19 and the two inserts 54, respectively, to facilitate rigidly securing the sprocket 19 to the sprocket supporting member 26. Alternative or additional means of securing the sprocket 19 to the sprocket support member 28 can be used, such as diffusion bonding or rivets.

The remaining sprockets 20 to 26 are similarly mounted to the sprocket support member 28 such that the mounting thereof is not described herein.

Referring to FIG. 3, the sprocket support member 28 is connected to the bicycle rear hub assembly 10 such that the hub engagement profile 30c formed on the radially inner peripheral surface 30a engages the splined portion 16a of the sprocket support body 16 of the rear hub assembly 10. A spacer 56 is disposed on the sprocket support body 16 adjacent a distal end 42b of the plurality of second sprocket supporting arms 42. A lock ring 58 is disposed on the sprocket support body adjacent the spacer 56. The spacer 56 properly positions the lock ring 58 such that a threaded portion 58a (FIG. 4) of the lock ring threadably engages the threaded portion 16c of the sprocket support body 16, thereby securing the bicycle rear sprocket assembly 11 to the bicycle rear hub assembly 10.

Figure 9:
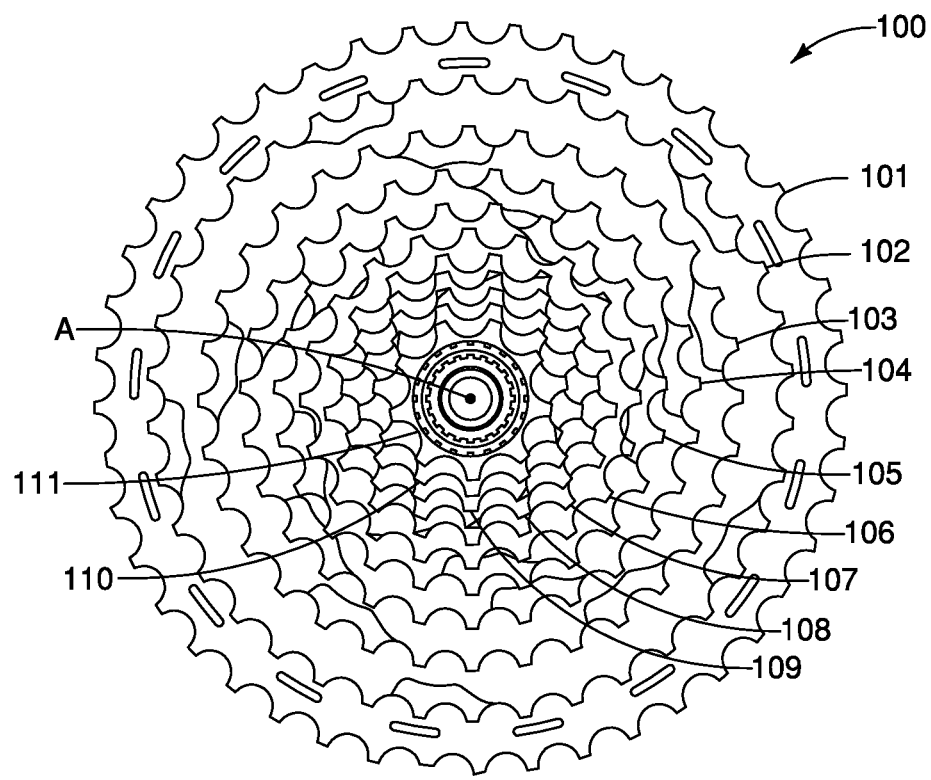
FIG. 9 is an outside elevational view of a first alternate rear sprocket assembly having eleven rear sprockets.

Referring now to FIG. 9, a first alternative rear sprocket assembly 100 is illustrated that can replace the rear sprocket assembly 11 of FIGS. 1 to 8. The first alternative rear sprocket assembly 100 is also configured to be mounted on the bicycle rear hub assembly 10 in a substantially similar manner as the rear sprocket assembly 11 of FIGS. 1 to 8, and is configured to be rotatable about the rotational center axis A. The first alternative rear sprocket assembly 100 includes a plurality of bicycle sprockets. The first rear sprocket assembly 100 has eleven rear sprockets 101 to 111. As shown, the first rear sprocket 101 includes forty-four sprocket teeth and the eleventh rear sprocket 111 includes nine sprocket teeth. Preferably, a tooth-number difference between the smallest sprocket (i.e., the eleventh rear sprocket 111) of the plurality of bicycle sprockets and the largest sprocket (i.e., the first rear sprocket 101) of the plurality of bicycle sprockets is equal to or greater than twenty-five. More preferably, a tooth-number difference between the smallest sprocket (i.e., the eleventh rear sprocket 111) of the plurality of bicycle sprockets and a largest sprocket (the first rear sprocket 101) of the plurality of bicycle sprockets is equal to or greater than thirty-five. In the exemplary embodiment illustrated in FIG. 9, the largest sprocket (i.e., first rear sprocket 101) of the plurality of bicycle sprockets has a total tooth number that is equal to or greater than forty-four. The smallest sprocket (i.e., the eleventh sprocket 111) of the plurality of bicycle sprockets has a total tooth number that is equal to or fewer than ten.

Thus, the first alternative rear sprocket assembly 100 has a first sprocket (i.e., the first rear sprocket 101) that has a first tooth number that is more than or equal to forty-four, and a second sprocket (i.e., the eleventh rear sprocket 111) that has a second tooth number that is less than or equal to ten. The first alternative rear sprocket assembly 100 has a teeth progression of 9-11-13-15-17-20-23-27-32-38-44.

Figure 10:
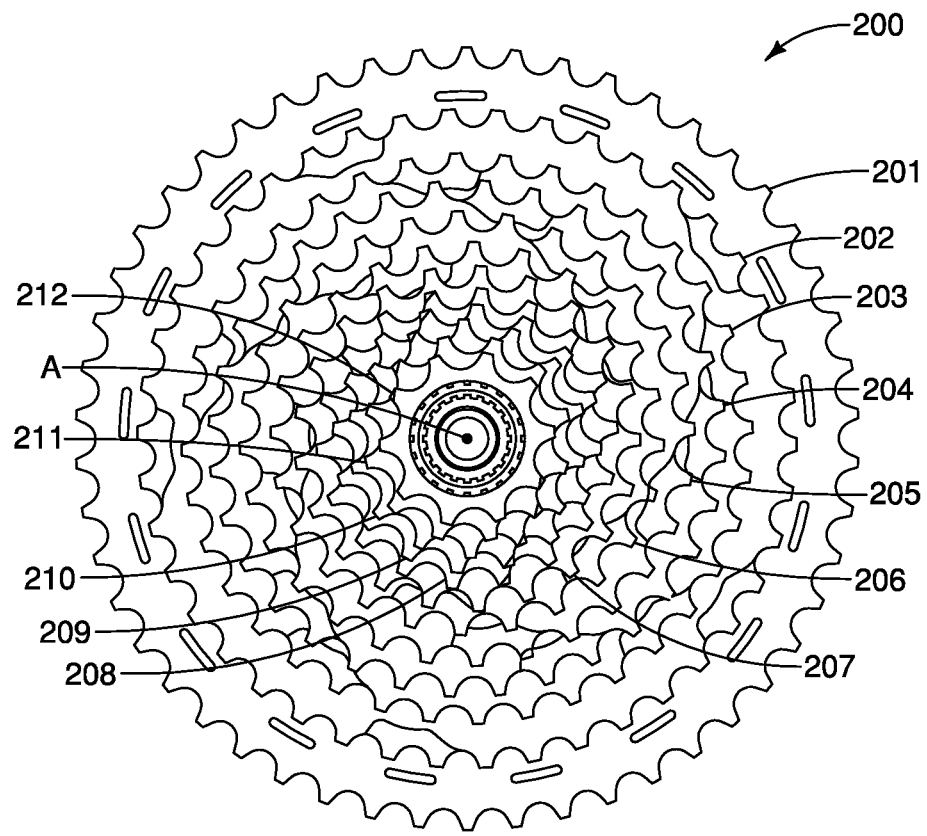
FIG. 10 is an outside elevational view of a second alternate rear sprocket assembly having twelve rear sprockets.

Referring now to FIG. 10, a second alternative rear sprocket assembly 200 is illustrated that can replace the rear sprocket assembly 11 of FIGS. 1 to 8. The second alternative rear sprocket assembly 200 is also configured to be mounted on the bicycle rear hub assembly 10 in a substantially similar manner as the rear sprocket assembly 11 of FIGS. 1 to 8, and is configured to be rotatable about the rotational center axis A. The second alternative rear sprocket assembly 200 includes a plurality of bicycle sprockets. As shown in FIG. 10, the rear sprocket assembly has twelve rear sprockets 201 to 212. As shown, the first rear sprocket 201 includes fifty sprocket teeth and the twelfth rear sprocket 212 includes ten sprocket teeth. In the illustrated embodiment, the first rear sprocket 201 (i.e., the largest sprocket) preferably has a total tooth number that is more than or equal to fifty. Preferably, the twelfth rear sprocket 212 (i.e., the smallest sprocket) has a second tooth number that is fewer than or equal to ten. Preferably, a tooth-number difference between the smallest sprocket (i.e., the twelfth rear sprocket 212) of the plurality of bicycle sprockets and the largest sprocket (i.e., the first rear sprocket 201) of the plurality of bicycle sprockets is equal to or greater than twenty-five. More preferably, a tooth-number difference between the smallest sprocket (i.e., the twelfth rear sprocket 212) of the plurality of bicycle sprockets and the largest sprocket (i.e., the first rear sprocket 201) of the plurality of bicycle sprockets is equal to or greater than thirty-five.

Thus, the second alternative rear sprocket assembly 200 has a first sprocket (i.e., the first rear sprocket 201) that has a total tooth number is more than or equal to fifty. Additionally, the second alternative rear sprocket assembly 200 has a second sprocket (i.e., the twelfth sprocket 212) that has a second tooth number that is fewer than or equal to ten. The second alternative rear sprocket assembly 200 has a teeth progression of 10-12-14-16-18-21-24-28-32-36-42-50.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle sprocket assembly. Accordingly, these directional terms, as utilized to describe the bicycle rear sprocket assembly should be interpreted relative to a bicycle in an upright riding position on a horizontal surface and that is equipped with the bicycle rear sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A bicycle sprocket assembly comprising:
   a sprocket support member including
      a hub engagement portion;
      a first sprocket supporting member extending from the hub engagement portion in a first axial direction parallel to a rotational center axis of the bicycle sprocket assembly and rearward of a rearward end of the hub engagement portion; and
      a second sprocket supporting member extending from the hub engagement portion in a second axial direction parallel to the rotational center axis and forward of a forward end of the hub engagement portion, the second axial direction being opposite to the first axial direction,
      at least one of the first sprocket supporting member and the second sprocket supporting member including a plurality of sprocket supporting arms,
   the sprocket support member being unitarily constructed as a one-piece member of the same material.

2. The bicycle sprocket assembly according to claim 1, wherein
   the plurality of sprocket supporting arms are spaced apart from each other in a circumferential direction with respect to the rotational center axis.

3. The bicycle sprocket assembly according to claim 2, wherein
   each of the sprocket supporting arms has a plurality of radially extending parts and a plurality of axially extending parts,
   the plurality of radially extending parts and the plurality of axially extending parts being alternately arranged in an axial direction parallel to the rotational center axis.

4. The bicycle sprocket assembly according to claim 2, wherein
   each of the sprocket supporting arms has a proximal end and a distal end,
   the distal end being configured to be spaced apart from a bicycle hub assembly in a radial direction with respect to the rotational center axis in a state where the bicycle sprocket assembly is mounted to the bicycle hub assembly.

5. The bicycle sprocket assembly according to claim 2, wherein
   each of the plurality of sprocket supporting arms has a radially inner peripheral surface and a radially outer peripheral surface,
   the radially outer peripheral surface being configured to support at least one bicycle sprocket.

6. The bicycle sprocket assembly according to claim 5, wherein
   at least one reinforcement portion is provided to the radially inner peripheral surface.

7. The bicycle sprocket assembly according to claim 1, wherein
each of the sprocket supporting arms has a proximal end and a distal end,
the plurality of sprocket supporting arms extend so that the distal end is spaced further from the rotational center axis than the proximal end.

8. The bicycle sprocket assembly according to claim 1, wherein
each of the sprocket supporting arms has a proximal end and a distal end,
the plurality of sprocket supporting arms extend so that the proximal end is spaced further from the rotational center axis than the distal end.

9. The bicycle sprocket assembly according to claim 1, wherein
the first sprocket supporting member includes a plurality of first sprocket supporting arms; and
the second sprocket supporting member includes a plurality of second sprocket supporting arms.

10. The bicycle sprocket assembly according to claim 9, wherein
the plurality of first sprocket supporting arms are spaced apart from each other in a circumferential direction with respect to the rotational center axis, and
the plurality of second sprocket supporting arms are spaced apart from each other in the circumferential direction.

11. The bicycle sprocket assembly according to claim 9, wherein
each of the first sprocket supporting arms has a first proximal end and a first distal end;
the plurality of first sprocket supporting arms extend so that the first distal end is spaced further from the rotational center axis than the first proximal end;
each of the second sprocket supporting arms has a second proximal end and a second distal end; and
the plurality of second sprocket supporting arms extend so that the second proximal end is spaced further from the rotational center axis than the second distal end.

12. The bicycle sprocket assembly according to claim 9, wherein
each of the first sprocket supporting arms has a plurality of first radially extending parts and a plurality of first axially extending parts;
the plurality of first radially extending parts and the plurality of first axially extending parts being alternately arranged in an axial direction parallel to the rotational center axis;
each of the second sprocket supporting arms has a plurality of second radially extending parts and a plurality of second axially extending parts; and
the plurality of second radially extending parts and the plurality of second axially extending parts being alternately arranged in an axial direction parallel to the rotational center axis.

13. The bicycle sprocket assembly according to claim 9, wherein
each of the first sprocket supporting arms has a first proximal end and a first distal end;
the first distal end being configured to be spaced apart from a bicycle hub assembly in a radial direction with respect to the rotational center axis in a state where the bicycle sprocket assembly is mounted to the bicycle hub assembly;
each of the second sprocket supporting arms has a second proximal end and a second distal end; and
the second proximal end being configured to be spaced apart from a bicycle hub assembly in a radial direction with respect to the rotational center axis in a state where the bicycle sprocket assembly is mourned to the bicycle hub assembly.

14. The bicycle sprocket assembly according to claim 9, wherein
each of the plurality of first sprocket supporting arms has a first radially inner peripheral surface and a first radially outer peripheral surface;
the first radially outer peripheral surface being configured to support at least one bicycle sprocket;
each of the plurality of second sprocket supporting arms has a second radially inner peripheral surface and a second radially outer peripheral surface; and
the second radially outer peripheral surface being configured to support at least one bicycle sprocket.

15. The bicycle sprocket assembly according to claim 14, wherein
at least one reinforcement portion is provided to at least one of the first radially inner peripheral surface and the second radially inner peripheral surface.

16. The bicycle sprocket assembly according to claim 1, wherein
the sprocket support member is made of a non-metallic material.

17. The bicycle sprocket assembly according to claim 16, wherein
the non-metallic material includes fiber reinforced plastic.

18. The bicycle sprocket assembly according to claim 1, wherein
the sprocket support member is made of a metallic material.

19. The bicycle sprocket assembly according to claim 18, wherein
the metallic material includes aluminum alloy.

20. The bicycle sprocket assembly according claim 1, wherein
the hub engagement portion has a radially inner peripheral surface and a radially outer peripheral surface,
a hub engagement profile being formed on the radially inner peripheral surface.

21. The bicycle sprocket assembly according to claim 20, wherein
the hub engagement profile includes a plurality of splines.

22. The bicycle sprocket assembly according to claim 20, wherein
the radially outer peripheral surface is configured to support at least one bicycle sprocket.

23. The bicycle sprocket assembly according to claim 1, further comprising
a plurality of bicycle sprockets, wherein
a tooth-number difference between a smallest sprocket of the plurality of bicycle sprockets and a largest sprocket of the plurality of bicycle sprockets is equal to or greater than twenty-five.

24. The bicycle sprocket assembly according to claim 1, further comprising
a plurality of bicycle sprocket, wherein
a tooth-number difference between a smallest sprocket of the plurality of bicycle sprocket and a largest sprocket of the plurality of bicycle sprocket is equal to or greater than thirty-five.

25. The bicycle sprocket assembly according to claim 1, further comprising
a plurality of bicycle sprockets, a largest sprocket of the plurality of bicycle sprockets having a total tooth number that is equal to or greater than forty-four.

26. The bicycle sprocket assembly according to claim 1, further comprising
a plurality of bicycle sprockets,
a smallest sprocket of the plurality of bicycle sprockets having a total tooth number that is equal to or fewer than ten.

* * * * *